2,614,910

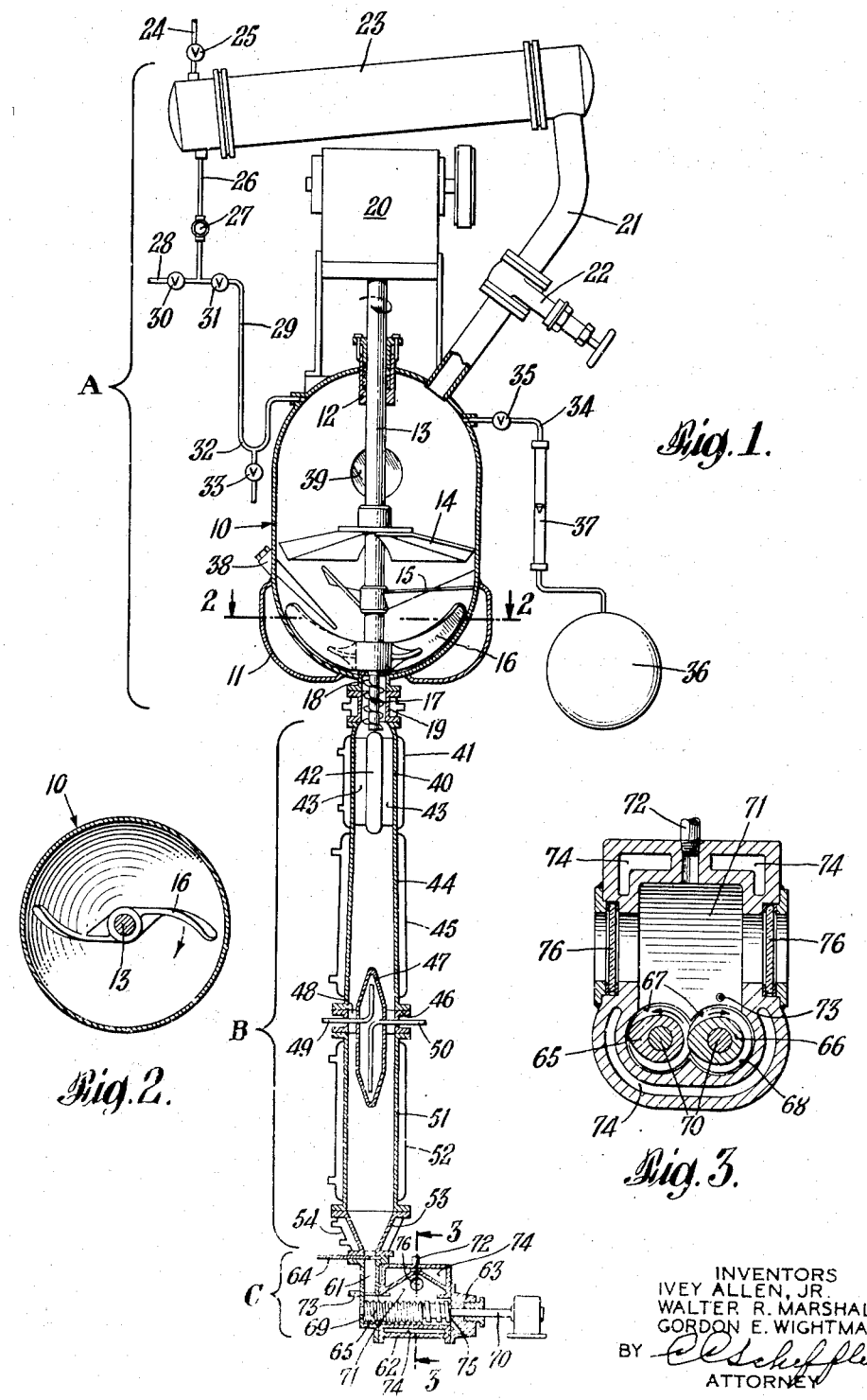
Oct. 21, 1952 — I. ALLEN, JR., ET AL — 2,614,910
CONTINUOUS POLYMERIZING APPARATUS
Filed June 14, 1949
INVENTORS
IVEY ALLEN, JR.
WALTER R. MARSHALL
GORDON E. WIGHTMAN
BY
ATTORNEY Patented Oct. 21, 1952

UNITED STATES PATENT OFFICE 2,614,910

CONTINUOUS POLYMERIZING APPARATUS

Ivey Allen, Jr., and Walter R. Marshall, Bloomfield, N. J., and Gordon E. Wightman, Newburgh, N. Y., assignors, by mesne assignments, to Union Carbide and Carbon Corporation, a corporation of New York Application June 14, 1949, Serial No. 98,959

7 Claims. (Cl. 23—290)

This invention relates to apparatus suitable for continuous polymerization of unsaturated organic compounds to solid resinous polymers. In general the unsaturated compounds are vinyl monomers, such as vinyl acetate, vinyl butyrate, styrene, chloro-styrenes, methyl, ethyl and propyl styrenes, vinyl naphthalene, etc.

More particularly, the invention comprises an apparatus assembly for accomplishing in a continuous manner the progressive steps of (a) initially polymerizing a monomer at a temperature yielding polymers of desired average molecular weight while subjecting the monomer and polymers formed to effective agitation, (b) completing the polymerization by heating a moving stream of partially polymerized material to relatively high temperatures, and (c) mechanically milling the polymerized material to remove volatiles and low molecular weight polymers therefrom.

An apparatus for the continuous polymerization of a polymerizable monomer and embodying structure for accomplishing the aforementioned improvements is illustrated in the accompanying drawing in which Fig. 1 is an elevation, largely in cross-section of an assembly;

Fig. 2 is a cross-section on the line 2—2 of Fig. 1; and

Fig. 3 is a cross-section on the line 3—3 of Fig. 1.

The assembled apparatus is comprised of three primary parts:

A. An autoclave with associated elements for partial polymerization;

B. A polymerizing tube for continuing the polymerization; and

C. A milling structure for mechanically working the polymerized polymer and releasing volatile matter therefrom.

Part A

The autoclave part consists of a closed still body or reaction vessel 10 having about its lower portion a jacket 11 for heating or cooling fluid to regulate the temperature; the still has a capacity of about 800 pounds. Passing through a bushing 12 at the top of the still is a vertical agitator shaft 13 which carries a series of agitator blades 14, 15 and 16 of which the upper and lower blades 14 and 16 are fastened to the shaft 13, to be rotated thereby. The middle set of blades 15 are stationary being rigidly secured to the interior walls of the autoclave. The hub to which the blades 15 are attached, serves as a bearing for the agitator shaft 13 which ends in a conveyor screw 17 extending into the outlet 18 of the still and into a jacketed coupling 19. Because of the high viscosity of the polymer formed, the agitator structure is rugged and heavy.

The upper rotating blades 14 are inclined backwardly with respect to the direction of rotation to force partially polymerized monomer outwardly; the blades 14 are also inclined downwardly in the direction or rotation to force the outwardly directed material concurrently in a downward direction along the autoclave walls. The stationary blades 15 have a twisted shape whereby the outer end of each blade is inclined downwardly and forwardly with respect to the direction of rotation of the upper rotating blades 14 and the downward movement of material along the autoclave walls. The inner end of each stationary blade 15 is inclined upwardly and forwardly.

Of the series of agitator blades, the top blades 14 serve to force the mass in movements outwardly and downwardly along the autoclave's walls, the intermediate fixed blades 15 accentuate this action at their outer ends while causing an upward flow near the shaft, and the bottom blades 16 (shown in Fig. 2) scrape the mass from the sides and force it inwardly toward the shaft where part of the mass is directed upwardly along the shaft and the balance downwardly out of the outlet 18. Additional intermediate rotating and stationary blade agitators can be included. The upper end of the shaft is connected by a gear reducer 20 to a motor or other driving mechanism not shown.

At the upper end of the still is an outlet pipe 21 for distillate controlled by a valve 22 and leading to a condenser 23. The condenser has a vapor-discharge line 24 with control valve 25 leading to a vacuum pump (not shown) and a condensate-discharge line 26 having therein a sight glass 27 for observation. Two branches 28, 29 with valves 30, 31 connect to the line 26; and one branch 29, provided with a trap 32 and discharge valve 33, leads back to the still.

Liquid monomer is drawn into the still through a feed line 34 controlled by a valve 35 from a feed drum 36. In the line is a rotameter 37 to indicate the rate at which the monomer flows into the still.

In the side of the still 10 is a tube 38 for receiving a thermometer. The still also has a sight glass 39 for watching the operation.

Part B

The polymerizing tube is suspended from the coupling 19, and it consists of five sections. The first section is a tubular preheater 40 with a heating jacket 41 and carrying an axially-disposed mandrel 42 by means of fins 43 to form an annular passage through which the plastic flows. The second section is a first reaction tube 44 with a heating jacket 45. The third section is a coupling 46 supporting a spindle shaped hollow heating element 47 by fins 48 to leave an annular passage; an inlet pipe 49 and an outlet pipe 50 to the heating element 47 provide for a heating fluid into and out of the interior thereof. The fourth section is a second reaction tube 51 with jacket 52. The fifth and last section is a discharge funnel 53 with a jacket 54.

Part C

Attached to the funnel 53 forming the outlet of the polymerizer B is an enclosed continuous vacuum roll-mill for mechanically working the polymerized product. It consists of three sections: a hopper 61, a housing 62 and a closure casting 63. The hopper has a slide gate 64 for controlling the feed of polymerized plastic. A pair of intermeshing helically-threaded rolls 65, 66 (Fig. 2) extend from the hopper 61 and through an opening 67 into the housing 62; these rolls lie in the saddle-shaped bore 68 and have a close clearance with the sides of the bore which extend within a part of the housing over at least one-half the circumference of the rolls; the rolls are completely encircled at the entrance to and the exit from the housing. The rolls are supported at the receiving end by stub shafts journaled in bearings in the wall 69 of the hopper, and at the other end by shaft extensions 70 passing through bearings in the casting 63. The screws for their major length have V or other suitable form of milling threads; but at the discharge end they are given square threads and completely enclosed to provide a positive pumping action. Above the V thread portions there is chamber 71 with an outlet 72 for connection to a condenser, vacuum pump and receiver; and a tube 73 opens into the chamber for feeding inert gas. The chamber has a surrounding heating jacket 74. There is an outlet port 75 through the casting 63; and sight glasses 76 are provided in the housing 62.

In operating the assembled apparatus, liquid monomer is continuously fed into the still from the drum 36 through the pipe 34. In its progress through the still it becomes polymerized by the heat of polymerization which is more than enough to continue the action; the excess heat is removed and the desired temperature maintained by the degree of vacuum (18–22 inches mercury) applied which regulates the boiling point of the monomer. The agitator blades direct and redistribute the mass; and as the product is withdrawn through the outlet 18, there is a gradual constant overall movement downwardly through the still, along with a continuous recycling action within the mass.

The bottom agitator blades 16 and the screw conveyor 17 regulate the discharge from the still and force it into the preheater of the polymerizing tube B. Here it is quickly raised in temperature to progress through the first reaction section 44. Further heating by the heating element 47 increases its mobility for further flow through the second reaction tube 51 and final discharge through the funnel 53 and gate 64 into the milling machine.

The operation of the threaded rolls combines the functions of milling and conveying. The threads become coated with polymer and continually expose fresh polymer surfaces collected from the small pools of churning excess material carried in the thread grooves within the bore through the opening 67. The rolls are preferably rotated in counter directions to draw some of the polymer material preferably upward through the clearance between the intermeshing threads while the remainder is conveyed toward the discharge end. The square threads at the discharge end act as a positive pump to eject the milled polymer through the port 75. In the operation both the entrance and exit openings are sealed by the polymer material, so that a high vacuum (29–29.9 inches of mercury) can be maintained in the housing. While the milling action is going on, the interior is swept by a stream of nitrogen to carry off released volatiles to the receiver, and the removal of volatiles can be accentuated by the vacuum application.

The hot polymer is discharged through orifices in a plate at the exit end of the roll-mill housing and picked up on a series of pulleys operated at such a speed as to reduce the cross-section area and give the material a stretch in excess of fifty per cent and usually of about 300 per cent during cooling. The cooled rod then passes to a cutter where it is cut continuously into segments of the length desired for commercial molding and extrusion operations.

This application is a continuation-in-part of our co-pending application Serial No. 505,908 filed October 12, 1943, now Patent No. 2,496,653.

What is claimed is:

1. Polymerizing apparatus comprising in combination, an autoclave shell having a surface of revolution provided with an inlet and an outlet, an agitator shaft journaled in said shell coaxial with said surface of revolution, agitator blades mounted on said shaft to rotate therewith inside said shell, an elongated jacketed tubular extension of smaller diameter than said shell and secured thereto in position surrounding said outlet and extending therefrom a greater length than said shell, and an enclosed kneading device comprising a casing secured to the discharge end of said jacketed tubular extension and having a rotating kneading element journaled in said casing.

2. Polymerizing apparatus comprising in combination, an autoclave shell having a surface of revolutions, an agitator shaft journaled in said shell coaxial with said surface of revolution, agitator blades mounted on said shaft to rotate therewith inside said shell, an elongated jacketed tubular extension of smaller diameter than said shell secured to the bottom thereof coaxial with said shaft and surrounding the discharge outlet of said shell, the lower end of said shaft extending down into said tubular extension, a screw conveyor on said shaft extension inside said jacketed tubular extension, and an enclosed kneading device comprising a casing secured to the discharge end of said jacketed tubular extension and having a rotating kneading element journaled therein.

3. Polymerizing apparatus comprising in combination, an autoclave shell having a surface of revolution provided with an inlet and an outlet, an agitator shaft journaled in said shell coaxial with said surface of revolution, agitator blades mounted on said shaft to rotate therewith inside said shell, an elongated jacketed tubular extension of smaller diameter than said shell and secured thereto in position surrounding said outlet, a member mounted inside said tubular extension by fins to form an annular passage, and an enclosed kneading device comprising a casing secured to the discharge end of said jacketed tubular extension and having a rotating kneading element journaled therein.

4. Polymerizing apparatus comprising in combination, an autoclave shell having a surface of revolution provided with an inlet and an outlet, an agitator shaft journaled in said shell coaxial with said surface of revolution, rotating agitator blades mounted on said shaft inside said shell and inclined backwardly and downwardly with respect to the direction of rotation and cooperating with fixed stationary blades secured to the inner wall of said shell, an elongated jacketed tubular extension of smaller diameter than said shell and secured thereto in position surrounding said outlet, and an enclosed kneading device comprising a casing secured to the discharge end of said jacketed tubular extension and having a rotating kneading element journaled in said casing.

5. Polymerizing apparatus comprising in combination, an autoclave shell having a surface of revolution provided with an inlet and an outlet, an agitator shaft journaled in said shell coaxial with said surface of revolution, rotary agitator blades on said shaft inside said shell cooperating with fixed stationary blades inclined downwardly and forwardly with respect to the direction of rotation and secured to the inner wall of said shell, an elongated jacketed tubular extension of smaller diameter than said shell and secured thereto in position surrounding said outlet, and an enclosed kneading device comprising a casing secured to the discharge end of said jacketed tubular extension and having a rotating kneading element journaled in said casing.

6. Polymerizing apparatus comprising in combination, an autoclave shell having a surface of revolution provided with an inlet and an outlet, an agitator shaft journaled in said shell coaxial with said surface of revolution, rotating agitator blades on said shaft inside said shell cooperating with fixed stationary blades secured to the inner wall of said shell, a lower set of said rotating blades conforming to the shape of the bottom of the shell and concave in the direction of rotation, an elongated jacketed tubular extension of smaller diameter than said shell and secured thereto in position surrounding said outlet, and an enclosed kneading device comprising a casing secured to the discharge end of said jacketed tubular extension and having a rotating kneading element journaled in said casing.

7. Polymerizing apparatus comprising in combination, an autoclave shell having a surface of revolution provided with an inlet and an outlet, an agitator shaft journaled in said shell coaxial with said surface of revolution, agitator blades mounted on said shaft to rotate therewith inside said shell, an elongated jacketed tubular extension of smaller diameter than said shell and secured thereto in position surrounding said outlet, an enclosed kneading device comprising a casing secured to the discharge end of said jacketed tubular extension and having a rotating kneading element journaled in said casing and a tube connected to said casing for removing volatile material from polymers discharged from said jacketed tubular extension.

IVEY ALLEN, Jr.
WALTER R. MARSHALL.
GORDON E. WIGHTMAN.

REFERENCES CITED

The following references are of record in the file of this patent:

UNITED STATES PATENTS

| Number | Name | Date |
|---|---|---|
| 1,450,326 | Maitland | Apr. 3, 1923 |
| 1,598,185 | Willard | Aug. 31, 1926 |
| 1,818,372 | Battilani | Aug. 11, 1931 |
| 2,273,822 | Allen | Feb. 24, 1942 |
| 2,340,834 | Hanson | Feb. 1, 1944 |
| 2,435,228 | Mann | Feb. 3, 1948 |
| 2,496,653 | Allen et al. | Feb. 7, 1950 |